United States Patent

[11] 3,558,118

| [72] | Inventors | Ronald F. Jensen<br>Houston, Tex.;<br>William E. Marshall, Middletown, Ohio |
|---|---|---|
| [21] | Appl. No. | 730,478 |
| [22] | Filed | May 20, 1968 |
| [45] | Patented | Jan. 26, 1971 |
| [73] | Assignee | Armco Steel Corporation<br>Middletown, Ohio<br>a corporation of Ohio |

[54] APPARATUS FOR THE GASEOUS REDUCTION OF PELLETIZED AND LUMP IRON ORES
9 Claims, 6 Drawing Figs.

| [52] | U.S. Cl. | 266/29, 263/26 |
|---|---|---|
| [51] | Int. Cl. | F27d 7/02 |
| [50] | Field of Search | 266/25, 27, 29, 20, 10; 263/26, 29, 31; 214/18V |

[56] References Cited
UNITED STATES PATENTS

| Re. 19,532 | 4/1935 | Freeman | 266/20X |
| 414,654 | 11/1889 | McCarty | 266/29X |
| 1,278,180 | 9/1918 | McDonald | 266/25X |
| 3,063,695 | 11/1962 | DeVaney. | |
| 3,204,941 | 9/1965 | Fraser. | |
| 3,307,840 | 3/1967 | Conroy | 263/26X |
| 3,375,098 | 3/1968 | Marshall | 266/29X |

FOREIGN PATENTS

| 1,033,944 | 7/1953 | France | 266/27 |

Primary Examiner—J. Spencer Overholser
Assistant Examiner—John E. Roethel
Attorney—Melville, Strasser, Foster & Hoffman

ABSTRACT: Apparatus for the gaseous reduction of pelletized and lump iron ores consisting of a shaft type furnace in which rotating means vertically disposed within the furnace assist in the descent of the ores and provide for a uniform distribution of the ascending reducing gases.

PATENTED JAN 26 1971
3,558,118
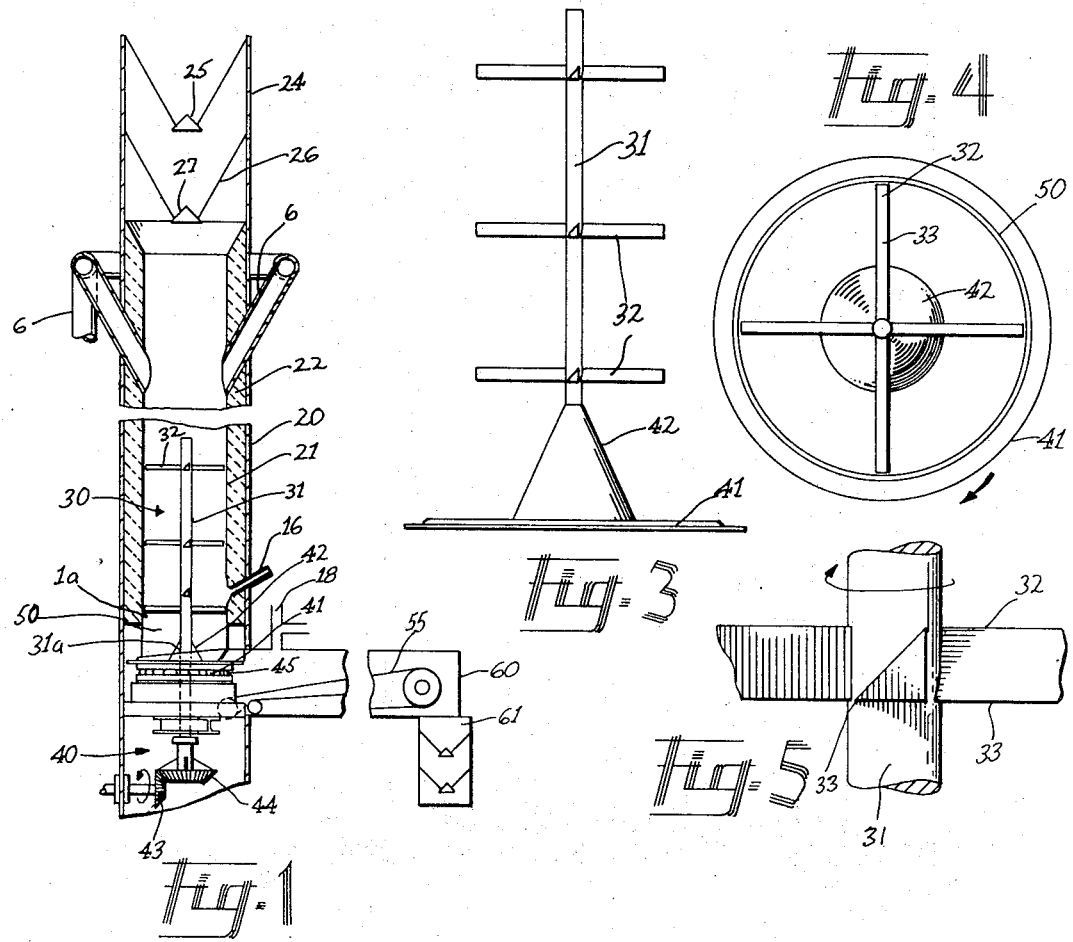
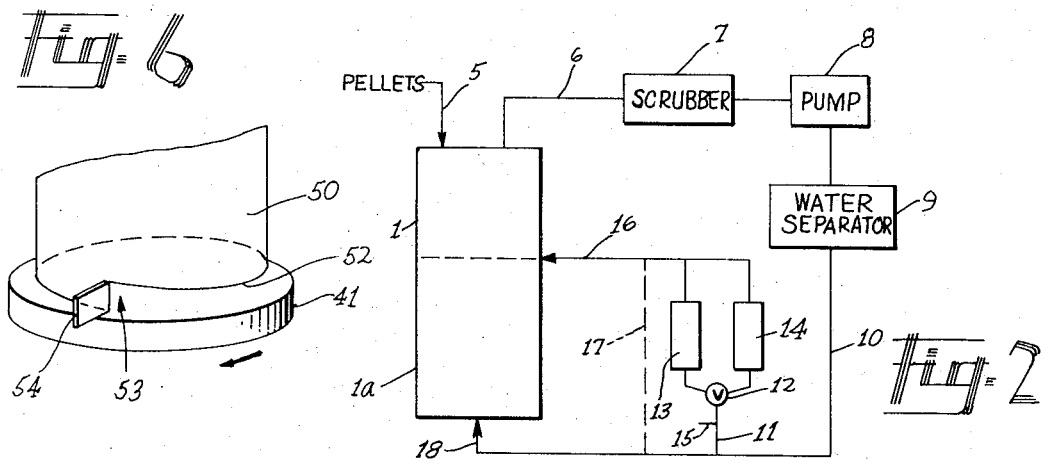
INVENTOR/S
RONALD F. JENSEN
WILLIAM E. MARSHALL
BY *Melville, Strasser, Foster and Hoffman*
ATTORNEYS 3,558,118

APPARATUS FOR THE GASEOUS REDUCTION OF PELLETIZED AND LUMP IRON ORES

BACKGROUND OF THE INVENTION

This application is related to U.S. Pat. No. 3,375,098 of W. E. Marshall, one of the present inventors, which patent is directed to a method for the gaseous reduction of pelletized iron ores to iron in a shaft furnace. The present invention is concerned with the combination of an improved shaft furnace whereby the process of said patent can be carried out in a more expeditious and trouble-free manner.

As indicated in said patent, it was the desire to improve the overall economics of steel making by developing apparatus to prereduce iron ore lumps or pellets of low gangue content to metallic iron for subsequent melting in electric and other types of steel making furnaces, thereby replacing both more expensive scrap and scrap containing objectionable nonferrous tramp elements. Also, prereduced iron ore lumps or pellets of higher gangue content can be used in the blast furnace to decrease coke rates and thus produce more and less expensive pig iron.

The artificial pellets of beneficiated iron ores to which reference has been made above are generally formed from taconites or other relatively inferior although abundant iron ore material. For example, the taconites, which are high in silica or other gangue materials, contain magnetic iron oxide. Thus, it is possible to crush the taconites to a very finely divided condition, and beneficiate the ore by magnetic separation. The beneficiated or rich material can then be formed into pellets, briquettes or other pieces of a sufficient size for use in a furnace in ways known to those skilled in the art. The beneficiated ore is regularly formed into spherical pellets having a diameter of about three-eighth inch and having sufficient durability for handling, shipment, storage and use in reducing furnaces or kilns. Pellets are currently made containing as much as 67 percent iron and as little as 1.5 percent silica or other gangue material. It is generally possible to make these pellets at a cost, on the basis of their iron content, comparable to the cost of blast furnace ore. For this reason, the use of these pellets in the blast furnace has been very successful.

The invention as claimed in said patent has to do with the direct gaseous reduction of pellets or lump ore of the type described above. The actual reduction of these pellets takes place in a vertically elongated shaft furnace. Some ores can be fed continuously through a shaft furnace with no major problems. However, there are other ores which tend to hang up and therefore require special techniques.

Before considering the improvements detailed herein, which resulted in overcoming the problems of the prior art, it may be helpful to consider a typical process, which employs the furnace of this invention to see what changes are effected therein. For example, presented solely for the purpose of describing the apparatus and is not intended as a limitation thereon, it will be recalled from said patent that the pellets are introduced into the furnace at the top where they are met by hot reducing gases such as carbon monoxide and hydrogen. The temperature of the gaseous reduction step is on the order of about 1300° F. to 1800° F. The gases from this reaction are drawn off through a conduit where they washed and cooled. The cooled withdrawn gases, whose moisture has been partially eliminated are passed through other elements of the system where they are reheated, enriched to increase reducing power, and returned to the furnace to repeat the cycle just described.

It will be apparent from the above that the pellets are caused to enter the top of the vertical shaft furnace and descend therethrough until discharged as reduced pellets at the bottom. Concurrently with the pellet descent, gases are ascending the furnace to reduce the pellets to metallic iron. To achieve a satisfactory or sufficient reduction of the pellets, it is necessary that the ascending gases completely bathe the pellets during the pellet descent. Further, to insure a proper and continuous process, it is essential that the pellets make a continuous descent while in the furnace. Typically, however, the descending pellets adhere together to form clusters or clinkers thereby "hanging up" in the furnace. This affects the gas flow and the uniform pellet descent. One attempt to solve the problem by the prior art is described in U.S. Pat. No. 3,063,695. Briefly, in said patent a plurality of horizontally disposed breaker shafts were proposed as the means to break up any agglomerated masses. Unfortunately, such a system was effective in only a limited area of the furnace. That is, it did not operate within a major portion of the bed depth of the treated material.

A second and more recent development is found in U.S. Pat. No. 3,204,941. Here, a rotary extractor cone is provided at the base of a shaft furnace to assist in breaking up the contained solid material. A further advantage attributed to the device of the latter patent is the assistance provided in the discharge of the treated material from the lower end of the furnace. However, even with these alleged advantages, such a system still did not satisfy the requirements of the problem solved by the present invention. The prior art system is ineffective for breaking up clinkers or "grapes" high in the furnace, and maintaining a proper circulation of the ascending gases.

Thus, it is believed apparent that the prior art, as exemplified by the systems of said preceding patents, failed to effectively solve the problems in the treatment of the materials described herein. The present invention teaches a system which insures steady, continual movement of the particles through the furnace in which they are subjected to a uniform reduction.

SUMMARY OF THE INVENTION

Briefly, in the practice this invention, an elongated vertical shaft-type furnace of the type described herein is provided with a device which is disposed centrally of the shaft from the bottom to approximately ⅓ to ⅔ of the height of the bed of material to be treated therein. In the preferred embodiment said device will extend to at least half the bed depth. The device is characterized by a central shaft, which is disposed along the axis of the furnace, and a plurality of arms extending perpendicular thereto. By motor means provided at the lower end of the shaft, the arms and shaft are caused to rotate within the furnace whereby to dislodge and break up any material which may tend to hesitate in its descent through the furnace. It is also contemplated in this invention to provide means about the lower end of said shaft to facilitate the removal of the treated material from the furnace.

BRIEF DESCRIPTION OF DRAWINGS

FIG. 1 is a vertical sectional view of an improved shaft type furnace constructed in accordance with the teachings herein.

FIG. 2 is a flow diagram of an exemplary process which can be practiced with the furnace of FIG. 1.

FIG. 3 is an enlarged vertical elevation with parts removed showing details of the structure of FIG. 1.

FIG. 4 is an enlarged plan view of the device shown in FIG. 3.

FIG. 5 is an enlarged partial elevational view showing details of the arm construction for the device of FIG. 3.

FIG. 6 is a perspective view showing details of the discharge portion of the shaft furnace of FIG. 1.

DETAILED DESCRIPTION OF THE INVENTION

Turning now to a more detailed description of this invention, it will be apparent from FIGS. 1 and 2 that while the unique shaft furnace constitutes the novel feature herein, the remaining structure shown schematically is representative of the types of apparatus essential for the continuous operation of the shaft furnace. It is as a result of the continuous operation that the unusual benefits of this invention are realized; namely, an uninterrupted descent of the pellets during their reduction and cooling, and a uniform distribution of gases over the cross-sectional area of the furnace.

The process of said Marshall patent, which process is exemplary of the methods which can be practiced on the shaft furnace 1 of this invention, is shown in flow chart form in FIG. 2. Here it will be seen that the pellets 5 or other particles of unreduced iron ore are introduced into the furnace at the top thereof where they begin their descent through the furnace 1. During such descent, the pellets are reduced in the furnace by reducing gases consisting essentially of carbon monoxide and hydrogen, and at an elevated temperature between about 1300° F. and about 1800° F., and preferably between about 1500° F. and about 1800° F. The top gases from the furnace are drawn off through a conduit 6 and passed through a gas washer or scrubber 7, where they are cooled. From here, the gases are forced such as by pump 8 through a water separator 9. Most of the gases, which have now had most of their moisture withdrawn, pass through conduits 10 and 11 and bypass 12 into either stove 13 or 14. Before entering a stove, the recirculated gases will be enriched with natural gas which enters the system through conduit 15 into conduit 11.

The function of stoves 13 and 14 is to reheat the reconstituted gases to the proper temperature range for reduction as well as to cause the reactions between carbon dioxide and methane, and between the remaining moisture and methane to take place, namely:

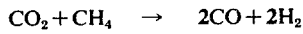

$$CO_2 + CH_4 \rightarrow 2CO + 2H_2$$

$H_2O + CH_4 \rightarrow CO + 3H_2$. The temperature range for such reactions is approximately 2000° F. to 3000 ° F. The heated process gases from stoves 13 and 14 are then collected and introduced to the furnace 1 through conduit 16.

In the event the process gases from stoves 13 and 14 attain too high a temperature, it is desirable to provide a bypass conduit 17 whereby a portion of the cooled top gases may be added to the hot process gases. Further, since it is desirable in the operation of the furnace 1 to maintain a cooled lower section 1a, a further portion of the cooled top gases may be introduced through conduit 18. The purpose of this is to cool the reduced ore pellets in a protective atmosphere preferably until they reach a temperature low enough to prevent air oxidation upon the removal of the reduced pellets from the furnace. It should be apparent from the foregoing exemplary process that the furnace of this invention can be operated in a continuous manner only so long as the pellets and counterflowing gases are free to pass substantially the length of the furnace.

Returning now to the mechanical features of the furnace, as shown in FIG. 1, the furnace comprises an outer shell 20 lined with insulative material or refractories 22, defining bore 21, throughout the length of the working portion of the furnace. The top of the furnace is provided with a double bell arrangement 24 for gas sealing purposes. The function and operation of such an arrangement are well known in the art. Briefly, by means of this arrangement, the pellets are delivered to the furnace and deposited on the first bell 25, which, when opened, permits the pellets to descend the upper portion of the furnace and rest in the hopper 26 and on bell 27. At such time as the pellets are ready to enter into the reduction operation, bell 25 is closed and bell 27 is opened allowing the pellets to begin their descent through the furnace.

Projecting up from the bottom of furnace 1 to a height which is approximately one-third to two-thirds and preferably at least half of the operating depth of the pellet bed, is a rabbling device indicated at 30 which slowly rotates during the operation of the furnace. It will be seen from the description to follow that the rabbling device 30 helps to maintain the pellets as discrete particles, thereby making it possible for the reducing gases to bathe the entire pellet. As mentioned previously, lump ores would behave similarly to pellets.

The rabbling device is shown in greater detail in FIGS. 3—5. Said device is characterized by a vertical shaft 31 arranged substantially along the centerline of furnace 1. Projecting at right angles from said shaft at spaced apart locations are a plurality of arms 32. The arms 32 may be contoured in the manner shown in FIG. 5 whereby the leading edge 33 facilitates the breakup of the clusters of pellets which tend to develop. This design also imparts a lifting action to the pellets.

Due to the heat and high stresses encountered by the rabbling device 30, it is desirable to construct the rabbling device with at least two arms 32 spaced uniformly in a given horizontal plane about the shaft 31. A further advantage may be attained by utilizing horizontal supports between adjacent arms. These two features tend to add strength and balance to the rabbling device which may otherwise become weakened as a result of the heat. Likewise, the number of planes in which arms 32 are disposed may vary, it being preferred to have at least two sets of arms when the rabbling device extends to less than half of the bed depth, and least three sets of arms when the device extends to one-half to two-thirds of the bed depth.

The vertical shaft 31 is mounted for rotative movement such as by the mechanism indicated generally at 40. Above the mechanism 40 and at the base 31a of the working portion of shaft 31, there is provided a feed table 41 which is fixed to said shaft for movement therewith. Surrounding base portion 31a is cone 42 designed to assist in spreading the descending pellets.

While the rotating mechanism 40 is not novel per se, it must be designed such as to operate under elevated temperature conditions. An exemplary system is shown in simplified form in FIG. 1. The rotating mechanism 40 comprises a pair of engaging bevel gears 43, 44 which, when motivated by external means not shown in the FIG., will cause the shaft 31 and feed table 41 to rotate at a rate depending on the rate of discharge desired and the diameter of the table. Generally, the rate will be well under one revolution per minute. For extra support the table 41 may be provided with underlying rollers 45. Thus, by this simple arrangement, the rabbling device 30 will be caused to rotate within the shaft furnace 1.

FIG. 6 is a perspective view of the feed area showing further refinement in the feed or distribution of the pellets. A skirt 50, whose diameter is approximately equal to the internal diameter of furnace 1, is disposed at the base of the furnace. The skirt 50 is actually a continuation of the furnace bore 21. The lower circumferential edge 52 of skirt 50 may be defined as a helix, whose lowest and highest points intersect in a vertical plane which substantially coincides with the exit 53 for the reduced pellets. In this same area there is provided a stationary scraper 54 to direct the reduced pellets onto the exiting conveyor 55. Thus, by providing for the greater opening between the helix edge 52 and table 41 in front of the scraper 54, greater amounts of pellets will be deposited there rather than behind the scraper. The cooled top gases in conduit 18 also enter the bottom of the furnace through the space between the skirt 50 and the table 41.

The final delivery of the reduced pellets is accomplished in a discharge hood 60 in which conveyor 55 operates. As the pellets reach the end of conveyor 55, they are deposited onto a double bell arrangement 61, from which selected quantities of reduced pellets are removed. Thus, throughout the gas reducing operation of the furnace, the pellets are protected against reoxidation.

To complete the exemplary process outlined above, means are provided in the furnace for admitting the recirculated gases of the process. Accordingly, conduits 16 and 18 of FIGS. 1 and 2 are shown extending into the furnace 1 and discharge hood 60, respectively.

From the foregoing description of a furnace, particularly the combination of a vertical shaft furnace having a rabbling device centrally disposed therein, it is possible to effect the reduction of iron ore lumps or pellets in a continuous and efficient manner. However, it should be apparent that certain modifications may be made in the structure without departing from the spirit and scope of this invention. For example, the conveying system may be replaced by another means capable of discharging the reduced pellets. Therefore, due to the fact that modifications may be found by those skilled in the art, no limitation is intended to be imposed herein except as set forth in the appended claims.

We claim:

1. In combination, a system for the gaseous reduction of iron ores to iron comprising a shaft type furnace having an upper portion for the heating and reducing of said ores, and a lower portion for cooling said reduced ores, means for introducing said iron ores into said furnace, means for discharging reduced ores from said furnace, a recirculating system connected to the top of said furnace for withdrawing gases therefrom, said recirculating system including means for admitting cooling gases to said lower portion, means for admitting regenerated hot reducing gases at an intermediate location in the furnace, and rotating means vertically disposed within said furnace to assist the descent of said iron ores in said furnace, said rotating means comprising a central shaft projecting one-third to two-thirds of the depth of the bed of materials to be treated in said furnace, and provided with a plurality of arms extending at substantially right angles thereto.

2. The combination according to claim 1, wherein said shaft is at least half the bed depth.

3. The combination according to claim 1, wherein said arms are disposed in at least one horizontal plane intersecting said shaft.

4. The combination according to claim 3, including a base rotating with said shaft and disposed adjacent said means for discharging reduced ores from said furnace.

5. The combination according to claim 4, including a cone mounting said base and surrounding a portion of said shaft.

6. The combination according to claim 3, wherein said arms are substantially triangular in cross section.

7. The combination according to claim 3, wherein the discharge end of said furnace is provided with a continuous circumferential skirt having a base defining a helix.

8. The combination according to claim 1, wherein said means for discharging reduced ores from said furnace includes a discharge hood protecting the reduced ores against oxidation by atmospheric gases.

9. The combination according to claim 8, wherein said discharging means further includes a conveying system operative within said hood.